US012739200B2

(12) United States Patent
Ganeriwal et al.

(10) Patent No.: US 12,739,200 B2
(45) Date of Patent: Sep. 15, 2026

(54) SYSTEMS AND METHODS FOR LOW CONVERGENCE TIME FOR MEDIA ACCESS CONTROL MOVE EVENTS

(71) Applicant: Juniper Networks, Inc., Sunnyvale, CA (US)

(72) Inventors: Gaurav Ganeriwal, Fremont, CA (US); Prabakaran Thirumali Sampath, San Jose, CA (US); SelvaKumar Sivaraj, Sunnyvale, CA (US); Anupam Kumar Singh, Bengaluru (IN); Akash B., Chennai (IN); Harisankar Ramalingam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 547 days.

(21) Appl. No.: 17/718,834

(22) Filed: Apr. 12, 2022

(65) Prior Publication Data

US 2023/0327989 A1 Oct. 12, 2023

(51) Int. Cl.
*H04L 45/00* (2022.01)
*H04L 12/46* (2006.01)
*H04L 45/02* (2022.01)

(52) U.S. Cl.
CPC .......... *H04L 45/66* (2013.01); *H04L 12/4641* (2013.01); *H04L 45/04* (2013.01)

(58) Field of Classification Search
CPC ..... H04L 45/66; H04L 12/4641; H04L 45/04; H04L 2012/4629; H04L 12/4633
See application file for complete search history.

(56) References Cited

U.S. PATENT DOCUMENTS

2016/0241515 A1 8/2016 Pai et al.
2017/0317919 A1 11/2017 Fernando et al.
2019/0052559 A1* 2/2019 Velayudhan ............ H04L 45/28
(Continued)

FOREIGN PATENT DOCUMENTS

CN 105991385 A 10/2016
CN 106936717 A 7/2017
(Continued)

OTHER PUBLICATIONS

Extended European Search Report for Application No. EP22175655.4, mailed on Nov. 15, 2022, 7 pages.

*Primary Examiner* — Noel R Beharry
(74) *Attorney, Agent, or Firm* — Harrity & Harrity, LLP

(57) ABSTRACT

In some implementations, a first network device may transmit data to a second network device based on the data being associated with a media access control (MAC) address that is associated with an access port of the second network device, wherein the first network device and the second network device are included in a plurality of network devices interconnected by first tunnels associated with a forwarding plane and second tunnels associated with a control plane. The first network device may determine that the MAC address is associated with an access port of the first network device and may transmit, via one or more first tunnels, a notification indicating that the MAC address is associated with the first network device. The first network device may transmit, via one or more second tunnels, a notification indicating that the MAC address is associated with the first network device.

20 Claims, 10 Drawing Sheets

(56) References Cited

U.S. PATENT DOCUMENTS

| | | | | |
|---|---|---|---|---|
| 2020/0127919 | A1* | 4/2020 | Nagarajan | H04L 45/28 |
| 2020/0412667 | A1* | 12/2020 | Elder | H04L 49/309 |
| 2021/0152593 | A1 | 5/2021 | Gao et al. | |
| 2022/0224626 | A1* | 7/2022 | Adiga H R | H04L 12/4633 |
| 2023/0217353 | A1* | 7/2023 | Tomy | H04L 45/02<br>370/329 |

FOREIGN PATENT DOCUMENTS

| | | | |
|---|---|---|---|
| CN | 109561004 | A | 4/2019 |
| CN | 111049874 | A | 4/2020 |
| EP | 3637701 | A1 | 4/2020 |
| EP | 3767883 | A1 | 1/2021 |
| WO | 2018109536 | A1 | 6/2018 |

* cited by examiner

SYSTEMS AND METHODS FOR LOW CONVERGENCE TIME FOR MEDIA ACCESS CONTROL MOVE EVENTS

BACKGROUND

An Ethernet virtual private network virtual extensible local area network (EVPN-VXLAN) is a network fabric that extends layer 2 connectivity as a network overlay (e.g., a virtual topology) over an existing physical network. The EVPN-VXLAN may decouple the physical network from the network overlay network, which may enable additional core, distribution, and access layer devices to be added to the network without modifying the physical network.

SUMMARY

Some implementations described herein relate to a method. The method may include transmitting, by a first network device, data to a second network device based on the data being associated with a media access control (MAC) address that is associated with an access port of the second network device. The first network device and the second network device may be included in a plurality of network devices of an Ethernet virtual private network virtual extensible local area network (EVPN-VXLAN). The plurality of network devices may be interconnected by a plurality of first tunnels and a plurality of second tunnels. The plurality of first tunnels may be associated with a forwarding plane and the plurality of second tunnels may be associated with a control plane. The method may include determining, by the first network device, that the MAC address is associated with an access port of the first network device. The method may include transmitting, by the first network device and via one or more first tunnels of the plurality of first tunnels, a first notification indicating that the MAC address is associated with the first network device based on the MAC address being associated with the access port of the first network device. The method may include transmitting, by the first network device and via one or more second tunnels of the plurality of second tunnels, a second notification indicating that the MAC address is associated with the first network device.

Some implementations described herein relate to a non-transitory computer-readable medium that stores a set of instructions for a first network device. The set of instructions, when executed by one or more processors of the first network device, may cause the first network device to transmit data to a second network device based on the data being associated with a MAC address that is associated with an access port of the second network device. The first network device and the second network device may be included in a plurality of network devices of an EVPN-VXLAN. The plurality of network devices may be interconnected by a plurality of first tunnels and a plurality of second tunnels. The plurality of first tunnels may be associated with a forwarding plane and the plurality of second tunnels may be associated with a control plane. The set of instructions, when executed by one or more processors of the first network device, may cause the first network device to determine that the MAC address is associated with an access port of the first network device. The set of instructions, when executed by one or more processors of the first network device, may cause the first network device to transmit, via one or more first tunnels of the plurality of first tunnels, a first notification indicating that the MAC address is associated with the first network device based on the MAC address being associated with the access port of the first network device. The set of instructions, when executed by one or more processors of the first network device, may cause the first network device to transmit, via one or more second tunnels of the plurality of second tunnels, a second notification indicating that the MAC address is associated with the first network device.

Some implementations described herein relate to a first network device. The first network device may include one or more memories and one or more processors. The first network device may be configured to transmit data to a second network device based on the data being associated with a MAC address that is associated with an access port of the second network device. The first network device and the second network device may be included in a plurality of network devices of an EVPN-VXLAN. The plurality of network devices may be interconnected by a plurality of first tunnels and a plurality of second tunnels. The plurality of first tunnels may be associated with a forwarding plane and the plurality of second tunnels may be associated with a control plane. The first network device may be configured to determine that the MAC address is associated with an access port of the first network device. The first network device may be configured to transmit, via one or more first tunnels of the plurality of first tunnels, a first notification indicating that the MAC address is associated with the first network device based on the MAC address being associated with the access port of the first network device. The first network device may be configured to transmit, via one or more second tunnels of the plurality of second tunnels, a second notification indicating that the MAC address is associated with the first network device.

DETAILED DESCRIPTION

Figure 1A:
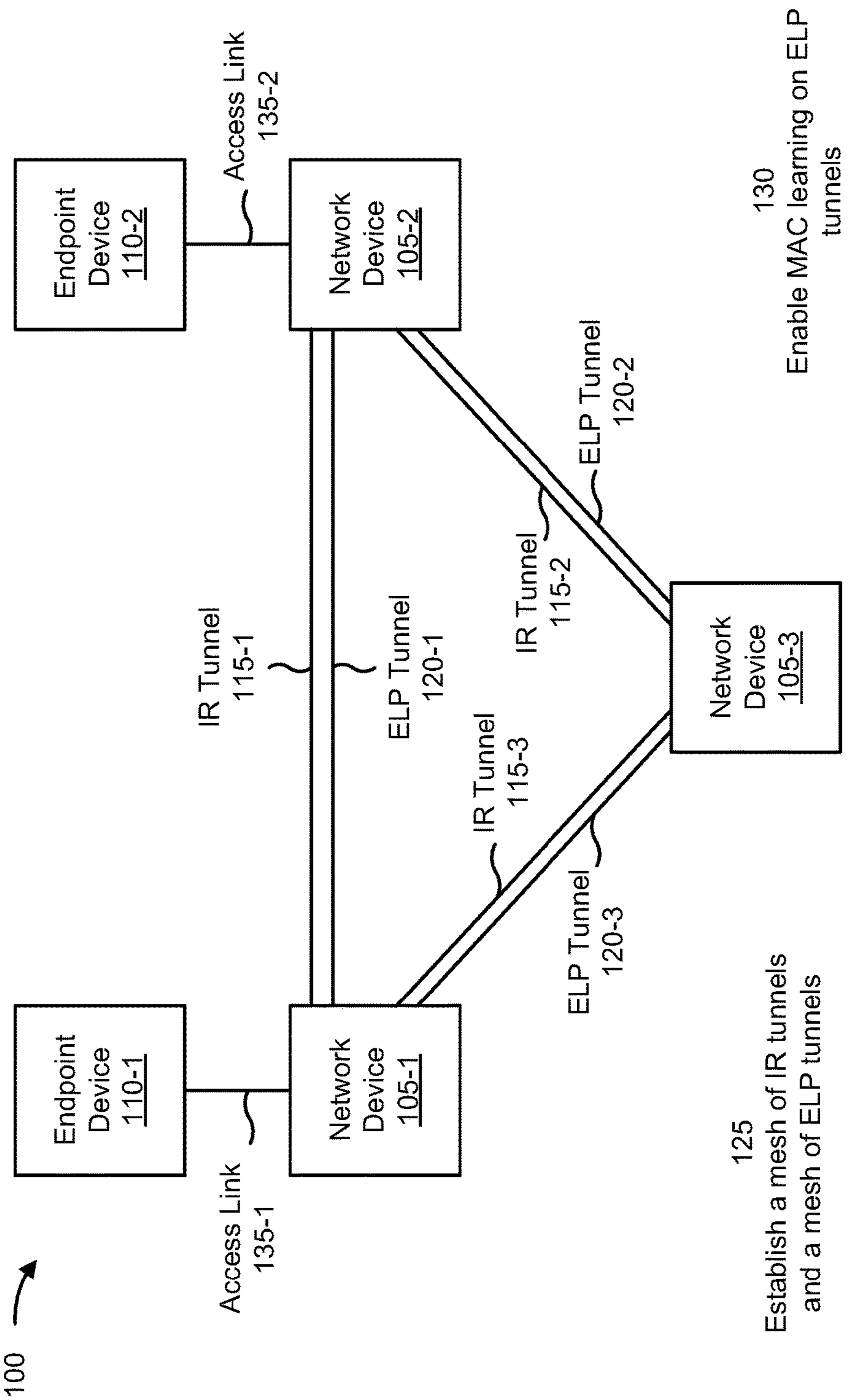
FIGS. 1A-1G are diagrams of an example implementation described herein.

The following detailed description of example implementations refers to the accompanying drawings. The same reference numbers in different drawings may identify the same or similar elements.

In some cases, a network may be deployed using an Ethernet virtual private network virtual extensible local area network (EVPN-VXLAN). The EVPN-VXLAN may comprise a group of network devices (e.g., a group of provider edge (PE) devices) for communicating data to a group of endpoint devices (e.g., a group of physical endpoint devices and/or a group of virtual endpoint devices). A mesh of ingress replication (IR) VXLAN virtual tunnel end point (VTEP) (referred to herein singly as an IR tunnel and collectively as IR tunnels) may be established between the network devices. The data may be communicated to an endpoint device based on a media access control (MAC) address associated with the endpoint device and a MAC route indicating a path through the EVPN-VXLAN for communicating data to a network device to which the endpoint device is connected.

In EVPN-VXLAN, MAC routes may be advertised using a border gateway protocol (BGP) protocol. For example, a BGP advertisement may be flooded to the network devices via the mesh of IR tunnels. In some cases, an endpoint device may move from one PE device to another network device (referred to herein as a MAC move). For example, in a data center, an endpoint device may move from one server to another server. As another example, the endpoint devices may correspond to a group of robots that are remotely controlled via the EVNP-VXLAN and the robots may move from one wireless access point to another wireless access point.

In the EVPN-VXLAN, a MAC move may be detected and an update to a MAC route may be promulgated via a control plane. For example, a BGP advertisement indicating the MAC move may be transmitted to each network device via the mesh of IR tunnels established between the network devices.

Upon an occurrence of a MAC move, a network device to which the endpoint device is now connected may advertise a MAC route update indicating that the endpoint device is now connected to the network device. The time required for the MAC route update to be promulgated through the EVPN-VXLAN (e.g., the convergence time) may be as short as a few milliseconds or as long as one second. The convergence may correspond to a window of traffic loss for the endpoint device as the MAC route for communicating data to the endpoint device is updated by the network devices.

Some implementations described herein enable a reduction in the convergence time for a MAC move occurring within an EVPN-VXLAN. In some implementations, an EVPN-VXLAN may include a plurality of network devices (e.g., a plurality of network devices, a plurality of server devices, and/or a plurality of wireless access points, among other examples). The EVPN-VXLAN may include a control plane comprising a mesh of IR tunnels established between the plurality of network devices.

The EVPN-VXLAN may also include a forwarding plane comprising a mesh of egress link protection (ELP) VXLAN V IEP tunnels (referred to herein singly as an ELP tunnel and collectively as ELP tunnels) established between the plurality of network devices. The creation of an ELP tunnel may be signaled via the control plane, and MAC learning may be enabled on the ELP tunnels.

Upon an occurrence of a MAC move, the network device to which an endpoint device is now connected may transmit an update indicating the MAC move to the plurality of network devices via the control plane (e.g., the mesh of IR tunnels). Additionally, the network device may transmit the update indicating the MAC move to the plurality of network devices via the forwarding plane (e.g., the mesh of ELP tunnels). The mesh of ELP tunnels may be utilized only for transmitting updates to MAC routes, which may result in less traffic being transmitted via the ELP tunnels and/or a reduction in an amount of time required for the update to the MAC route to be promulgated to the plurality of network devices. As a result, an amount of traffic loss associated with the occurrence of the MAC move may be reduced.

FIGS. 1A-1G are diagrams of an example implementation 100 associated with low convergence time for MAC move events. As shown in FIGS. 1A-1G, example implementation 100 includes a group of network devices 105 (shown as network device 105-1 through network device 105-3) and a group of endpoint devices 110 (shown as endpoint device 110-1 and endpoint device 110-2). These devices are described in more detail below in connection with FIG. 2 and FIG. 3.

In some implementations, the group of network devices 105 and the group of endpoint devices 110 may be interconnected by a plurality of communication links. In some implementations, the group of network devices 105 may be included in an EVPN-VXLAN and the plurality of communication links may comprise a plurality of tunnels interconnecting each network device 105 to each other network device 105.

For example, as shown in FIG. 1A, and by reference number 125, the group of network devices 105 may establish a mesh of IR tunnels 115 and a mesh of ELP tunnels 120. In some implementations, the mesh of IR tunnels 115 may be established to interconnect the group of network devices 105 via a control plane of the EVPN-VXLAN.

In some implementations, the mesh of ELP tunnels 120 may be established to interconnect the group of network devices 105 via a forwarding plane of the EVPN-VXLAN. In some implementations, as shown by reference number 130, MAC learning may be enabled on the ELP tunnels 120. In some implementations, based on MAC learning being enabled on the ELP tunnels 120, the ELP tunnels 120 may be configured to only carry data indicating a MAC move, as described in greater detail below.

In some implementations, to establish the mesh of IR tunnels 115 and/or the mesh of ELP tunnels 120, the first network device 105-1 may communicate with a second network device 105-2 to establish a first IR tunnel 115-1 and/or a first ELP tunnel 120-1 between one or more network ports of the first network device 105-1 and one or more network ports of the second network device 105-2. The second network device 105-2 may communicate with a third network device 105-3 to establish a second IR tunnel 115-2 and/or a second ELP tunnel 120-2 between one or more network ports of the second network device 105-2 and one or more network ports of the third network device 105-3. Similarly, the first network device 105-1 may communicate with the third network device 105-3 to establish a third IR tunnel 115-3 and/or a third ELP tunnel 120-3 between one or more network ports of the first network device 105-1 and one or more network ports of the third network device 105-3.

Each of the endpoint devices 110 may connect to one of the network devices 105 via an access link 135. For example, as shown in FIG. 1A, a first endpoint device 110-1 may establish a communication link (shown as access link 135-1) with the first network device 105-1 via an access port of the first network device 105-1, and a second endpoint device 110-2 may establish a communication link (shown as access link 135-2) with the second network device 105-2 via an access port of the second network device 105-2.

Figure 1B:
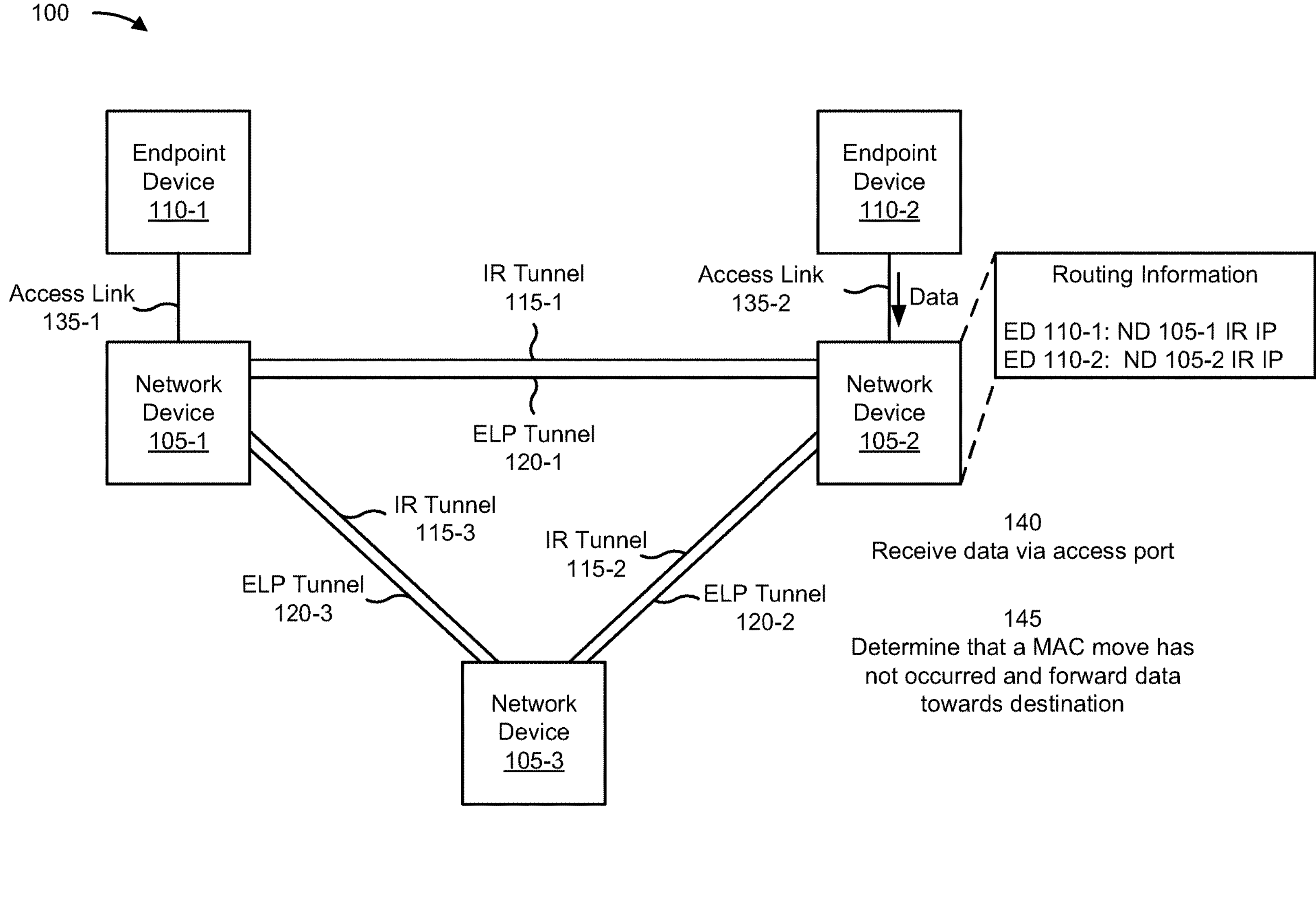

In some implementations, a network device 105 (e.g., the second network device 105-2) may determine that an endpoint device 110 (e.g., the second endpoint device 110-2) is connected to the network device 105 based on receiving data from the endpoint device 110 via an access port (rather than via a network port) of the network device 105. For example, as shown in FIG. 1B, and by reference number 140, the second network device 105-2 may receive data from the second endpoint device 110-2 via an access port associated with the access link 135-2. The second network device 105-2 may determine that the second endpoint device 110-2 is connected to the second network device 105-2 based on the data being received from the second endpoint device 110-2 via the access port of the second network device 105-2.

In some implementations, the second network device 105-2 may determine whether a MAC move has occurred based on receiving the data from the second endpoint device 110-2 via the access port of the second network device 105-2. In some implementations, the second network device 105-2 may determine whether routing information stored in a data structure (e.g., a routing table) indicates that the second endpoint device 110-2 is connected to the second network device 105-2. The second network device 105-2 may determine that a MAC move has not occurred when the routing information indicates that the second endpoint device 110-2 is connected to the second network device 105-1. The second network device 105-2 may determine that a MAC move has occurred when the routing information indicates that the second endpoint device 110-2 is connected to a device other than the second network device 105-1.

As an example, the data received from the second endpoint device 110-2 may include information indicating a source device (e.g., a MAC address associated with the second endpoint device 110-2) and information indicating a destination device (e.g., a MAC address associated with a device to which the data is to be transmitted, such as another endpoint device 110 or another network device 105, among other examples). In some implementations, the second network device 105-2 may determine that the routing information stored in the data structure indicates that the second endpoint device 110-2 is connected to a device other than the second network device 105-2, as described in greater detail below with respect to FIG. 1C.

In some implementations, the second network device 105-2 may determine that the routing information stored in the data structure indicates that the second endpoint device 110-2 is connected to the second network device 105-2. For example, the data structure may include routing information that associates the second endpoint device 110-2 (e.g., the MAC address associated with the second endpoint device 110-2) with the second network device 105-2.

As shown by reference number 145, the second network device 105-2 may determine that a MAC move has not occurred based on the routing information associating the MAC address associated with the second endpoint device 110-2 with the second network device 105-2 and may forward the data toward the destination device. For example, the second network device 105-2 may determine a network device 105 to which the destination device is connected based on the routing information stored in the data structure and may forward the data to the destination device via the network device 105 to which the destination device is connected.

Figure 1C:
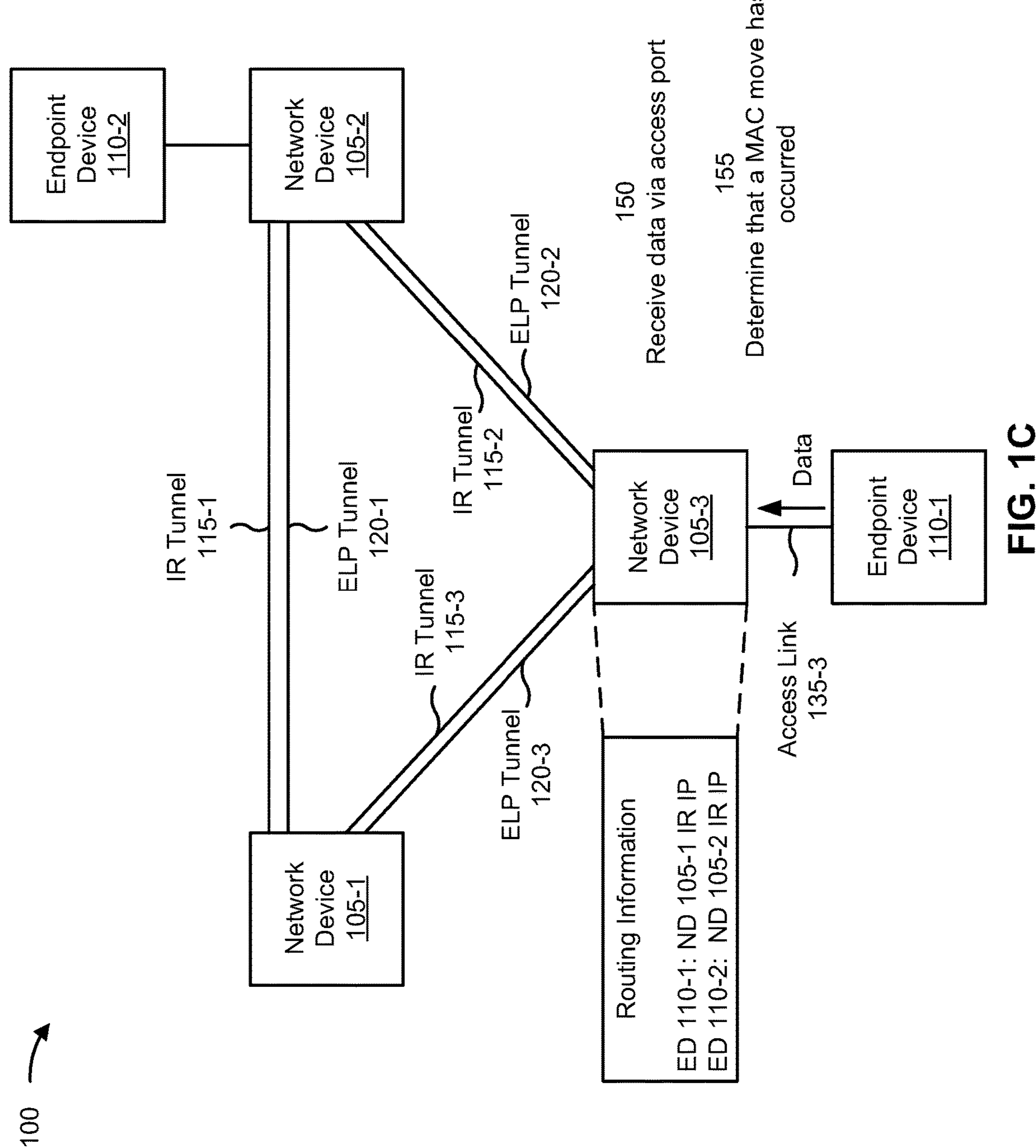

As shown in FIG. 1C, the first endpoint device 110-1 may move from the first network device 105-1 to the third network device 105-3. For example, the first endpoint device 110-1 may comprise a robot operating within a warehouse and the robot (e.g., the first endpoint device 110-1) may move from a location within a coverage area of the first network device 105-1 to a location within a coverage area of the third network device 105-3. The first endpoint device 110-1 may establish, based on moving to the location within the coverage area of the third network device 105-3, a communication link (shown as access link 135-3) with the third network device 105-3 via an access port of the third network device 105-3.

As shown by reference number 150, the third network device 105-3 may receive data from the first endpoint device 110-1 via the access link 135-3. The third network device 105-3 may determine that the first endpoint device 110-1 is connected to the third network device 105-3 based on receiving the data from the first endpoint device 110-1 via the access port of the third network device 105-3 that is associated with the access link 135-3.

In some implementations, the third network device 105-3 may determine whether a MAC move has occurred based on receiving the data from the first endpoint device 110-1 via the access port of the third network device 105-3. In some implementations, the third network device 105-3 may determine whether a MAC move has occurred based on routing information stored in a data structure, in a manner similar to that described above with respect to FIG. 1B.

In some implementations, the routing information may indicate that the first endpoint device 110-1 is associated with the first network device 105-1. For example, as shown in FIG. 1C, the routing information may indicate that the first endpoint device 110-1 is associated with an IR tunnel of the first network device 105-1 (shown as ED 110-1: ND 105-1 IR IP). As shown by reference number 155, the third network device 105-3 may determine that a MAC move has occurred based on the routing information indicating that the first endpoint device 110-1 is associated with the first network device 105-1 (rather than the third network device 105-3).

Figure 1D:
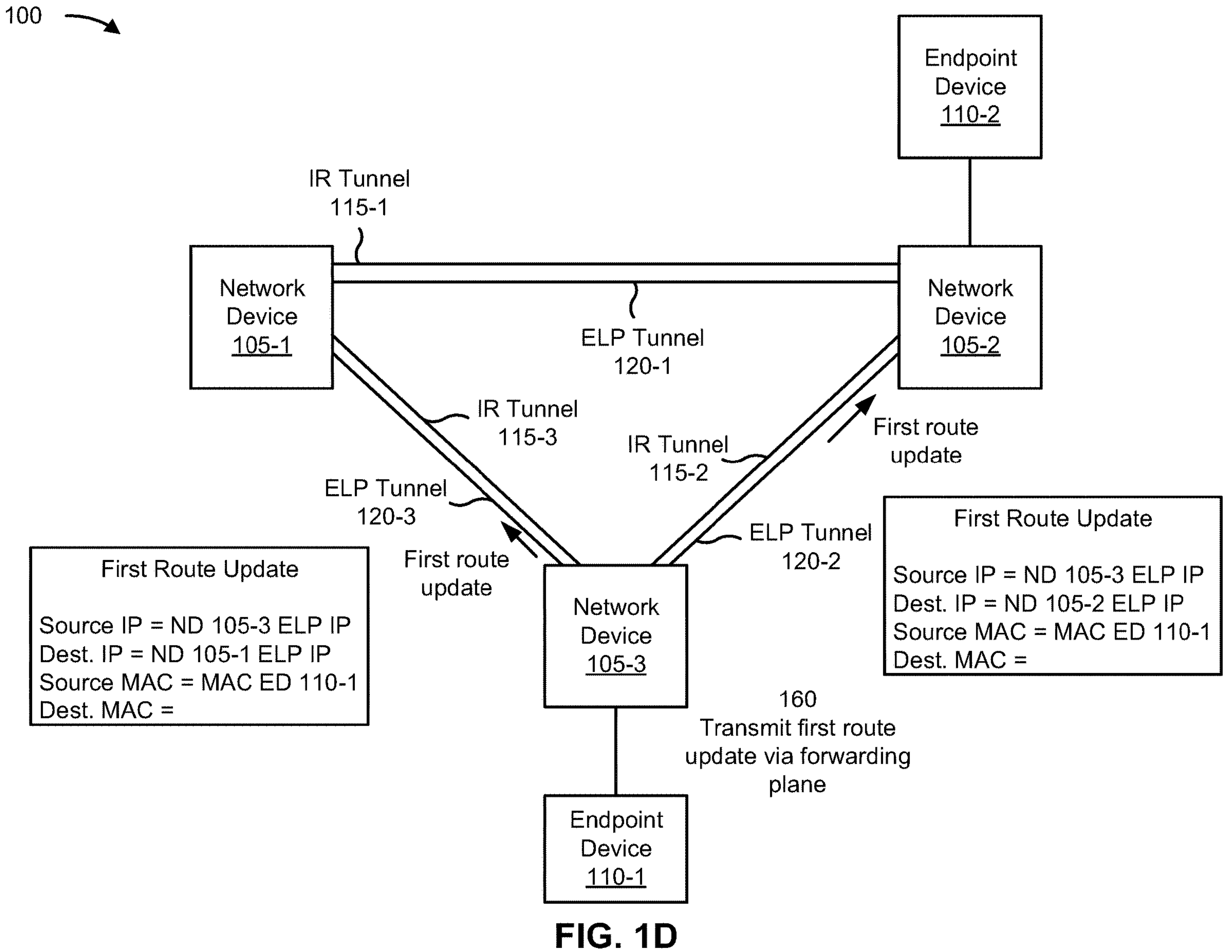

As shown in FIG. 1D, and by reference number 160, the third network device 105-3 may transmit a first route update via the forwarding plane (e.g., the ELP tunnels 120). In some implementations, the third network device 105-3 may transmit the first route update to each network device 105 included in the EVPN-VXLAN. For example, as shown in FIG. 1D, the third network device 105-3 may transmit the first route update to the first network device 105-1 via the third ELP tunnel 120-3 and to the second network device 105-2 via the second ELP tunnel 120-2.

In some implementations, the third network device 105-3 may transmit the first route update based on a filter that is installed in the forwarding plane. The filter may be associated with a filter action that is executed when data indicating a source device (e.g., a MAC address of the first endpoint device 110-1) associated with a network port is received via an access port of the third network device 105-3. In some implementations, the filter action may include flooding (e.g., transmitting) the first route update to each network device 105 based on an ELP flood next hop (e.g., routing information for each network device 105 connected to the third network device 105-3 via an ELP tunnel 120). In some implementations, the ELP flood next hop may be configured via one or more messages transmitted via the control plane.

In some implementations, the third network device 105-3 may transmit the first route update to the network device 105 indicated by the routing information as being associated with the first endpoint device 110-1. For example, the third network device 105-3 may transmit the first route update to the first network device 105-1 via the third ELP tunnel 120-3 based on the routing information indicating that the first endpoint device 110-1 is associated with the first network device 105-1.

Figure 1E:
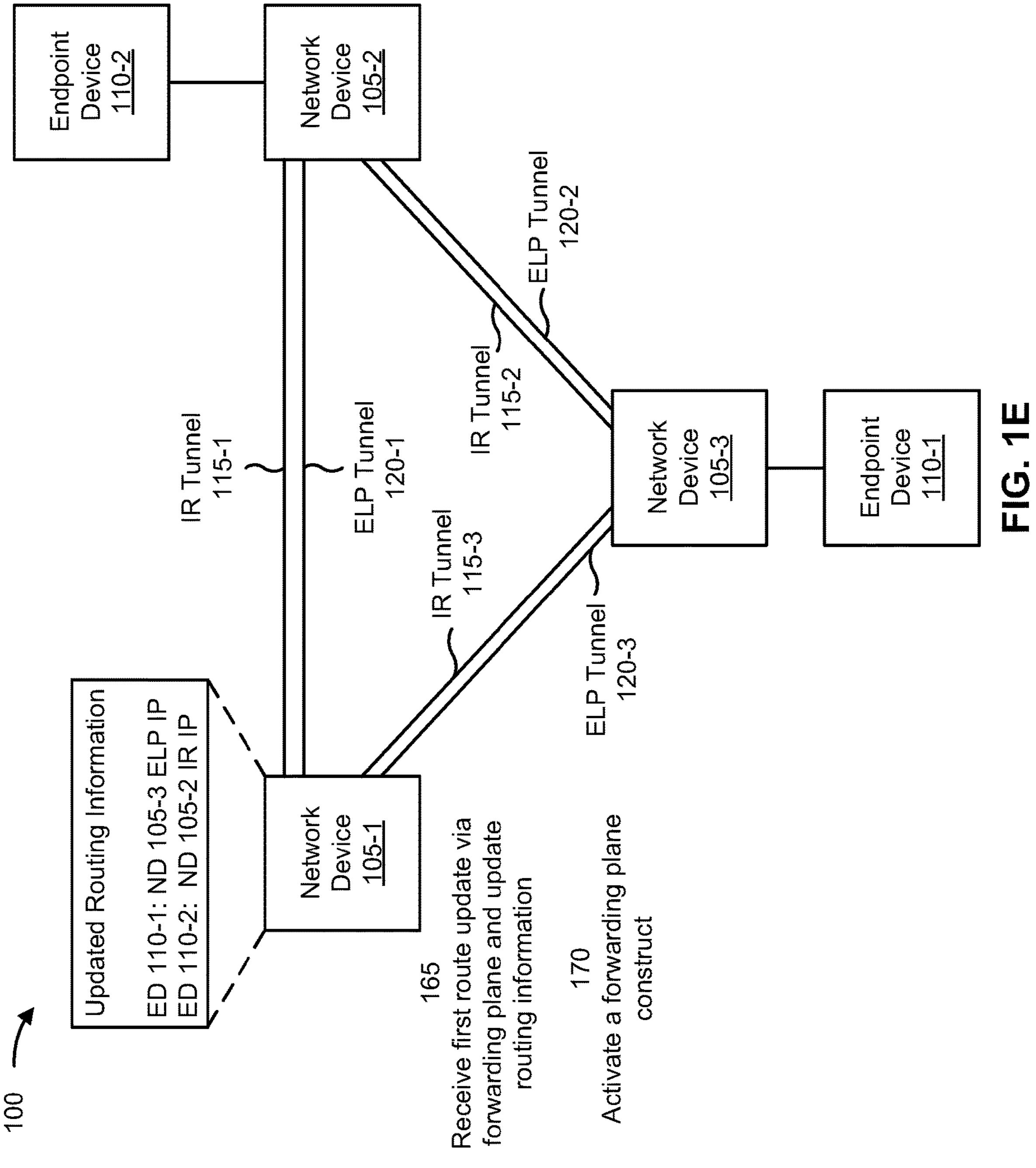

As shown in FIG. 1E, and by reference number 165, the first network device 105-1 may receive the first route update via the forwarding plane (e.g., via the third ELP tunnel 120-3) and may update routing information associated with the first endpoint device 110-1 based on the first route update and based on MAC learning being enabled for the third ELP tunnel 120-3. In some implementations, the first network device 105-1 may determine the updated routing information based on a communication link via which the first route update was received and/or a network device 105 that generated and/or transmitted the first route update. For example, as shown in FIG. 1E, the first network device 105-1 may update the routing information to indicate that the first endpoint device 110-1 is associated with the third network device 105-3 and the third ELP tunnel 120-3 based on receiving the first route update from the third network device 105-3 via the third ELP tunnel 120-3.

As shown by reference number 170, the first network device 105-1 may activate a forwarding plane construct based on updating the routing information. The forwarding plane construct may be implemented using a forwarding technique (e.g., a next hop and/or a filter, among other examples).

In some implementations, a plurality of forwarding plane constructs may be activated. The plurality of forwarding plane constructs may be associated with a plurality of bridge domains. For example, the EVPN-VXLAN may include a plurality of bridge domains that are stretched non-uniformly across the network devices 105. A forwarding plane construct may be installed for each bridge domain based on the plurality of bridge domains being stretched non-uniformly across the network devices 105.

In some implementations, the forwarding plane construct may include a single forwarding plane construct associated with the plurality of bridge domains. For example, the EVPN-VXLAN may include a plurality of bridge domains that are stretched uniformly across the network devices 105. A single forwarding plane construct may be installed for the plurality of bridge domains based on the plurality of bridge domains being stretched uniformly across the network devices 105.

In some implementations, the forwarding plane construct may cause data destined for the first endpoint device 110-1 to prevent data from being transmitted via the third ELP tunnel 120-3. Additionally, or alternatively, the forwarding plane construct may re-direct the data destined for the first endpoint device 110-1 to cause the data to be transmitted via the third IR tunnel 115-3 (rather than the third ELP tunnel 120-3). In some implementations, the forwarding plane construct may re-direct the data based on a re-route composite next hop. The re-route composite next hop may include a mapping of an ELP tunnel 120 to an associated IR tunnel 115. For example, the re-route composite next hop may map the first ELP tunnel 120-1 to the first IR tunnel 115-1. Similarly, the re-route composite next hop may map the third ELP tunnel 120-3 to the third IR tunnel 115-3.

In some implementations, the first network device 105-1 may install the forwarding plane construct based on one or more messages received via the control plane (e.g., via the IR tunnels 115). For example, the first network device 105-1 may receive (e.g., from a network device 105, a controller configured to manage and/or maintain the EVPN-VXLAN, and/or another device associated with the EVPN-VXLAN) a message indicating that MAC learning is to be enabled on the ELP tunnels 120 and/or that the forwarding plane construct is to be installed.

In some implementations, the first network device 105-1 may activate the forwarding plane construct based on updating the routing information to indicate that the first endpoint device 110-1 is associated with the third ELP tunnel 120-3, based on the ELP tunnels 120 being configured for only the transmission of route updates, and/or based on MAC learning being enabled on the ELP tunnels 120. In this way, the first network device 105-1 may prevent the third network device 105-3 from updating the routing information for the first endpoint device 110-1 each time the third network device 105-3 receives data for the first endpoint device 110-1.

In some implementations, the second network device 105-2 may receive the first route update via the second ELP tunnel 120-2. The second network device 105-2 may update routing information for the first endpoint device 110-1 based on the first route update and may activate a forwarding plane construct based on updating the routing information. In some implementations, the second network device 105-2 may update the routing information for the first endpoint device 110-1 and may activate the forwarding plane construct in a manner similar to that described above.

Figure 1F:
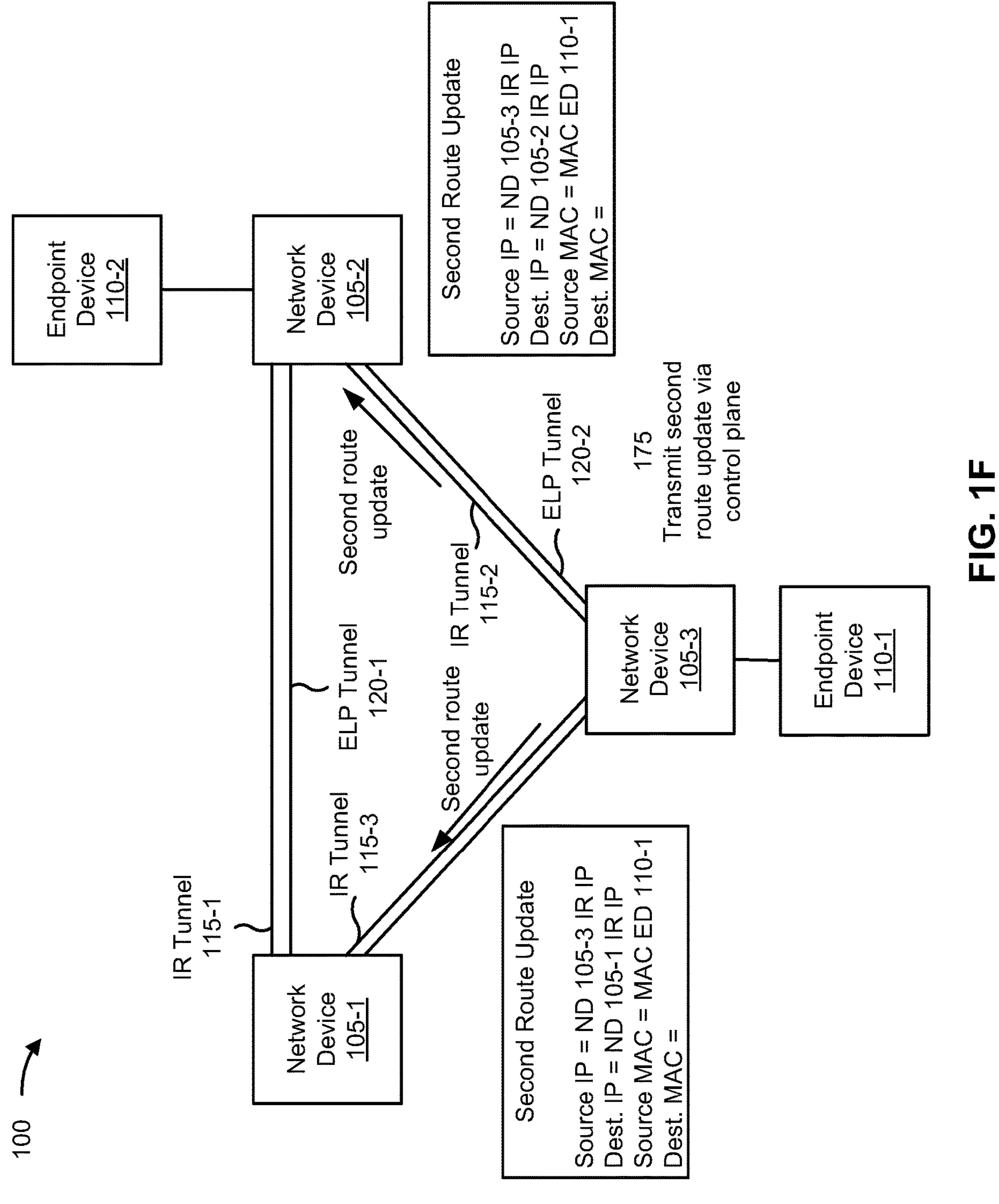

As shown in FIG. 1F, and by reference number 175, the third network device 105-3 may transmit a second route update via the control plane (e.g., the IR tunnels 115). The second route update may indicate that the first endpoint device 110-1 is associated with the third network device 105-3. In some implementations, the second route update may include a BGP advertisement. In some implementations, the third network device 105-3 may transmit the second route update to each network device 105 included in the EVPN-VXLAN. For example, as shown in FIG. 1F, the third network device 105-3 may transmit the second route update to the first network device 105-1 via the third IR tunnel 115-3 and to the second network device 105-2 via the second IR tunnel 115-2.

Figure 1G:
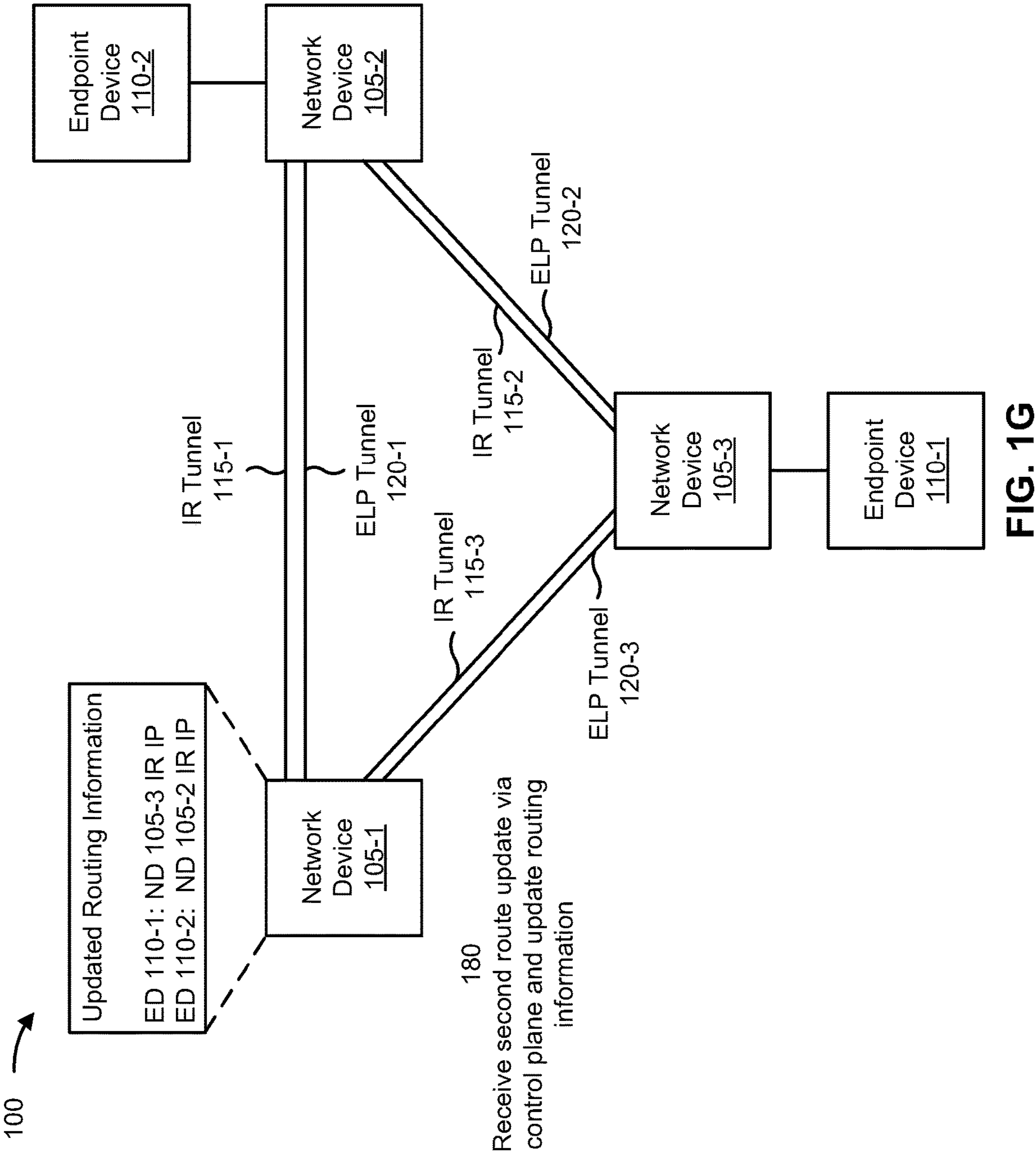

As shown in FIG. 1G, and by reference number 180, the first network device 105-1 may receive the second route update via the control plane (e.g., via the third IR tunnel 115-3) and may update the routing information associated with the first endpoint device 110-1 based on the second route update. In some implementations, the first network device 105-1 may determine the updated routing information based on a communication link via which the second route update was received and/or a network device 105 that generated and/or transmitted the second route update. For example, as shown in FIG. 1G, the first network device 105-1 may update the routing information to indicate that the first endpoint device 110-1 is associated with the third network device 105-3 and the third IR tunnel 115-3 based on receiving the second route update from the third network device 105-3 via the third IR tunnel 115-3.

In some implementations, a priority of the second route update may be greater than a priority of the first route update. When information included in the second route update conflicts with or is different from information included in the first route update, the first network device 105-1 may utilize the information included in the second route update to update the routing information, based on the priority of the second route update being greater than the priority of the first route update.

In some implementations, the first network device 105-1 may receive the second route update prior to the first route update being received and/or processed by the first network device 105-1. In these implementations, the first network device 105-1 may update the routing information based on the second route update. Upon receiving and/or processing the first route update, the first network device 105-1 may determine that the routing information has been updated based on the second route update and may drop or discard the first route update.

In some implementations, the first network device 105-1 may initiate a timer based on receiving the first route update. The timer may be initiated to limit the amount of time that an endpoint device 110 may be associated with an ELP tunnel 120. For example, the first network device 105-1 may determine whether the second route update is received prior to the expiration of the timer. The first network device 105-1 may update the routing information based on the second route update when the second route update is received prior to the expiration of the timer.

In some implementations, the first network device 105-1 may revert the routing information to a previous state when the second route update is not received prior to the expiration of the timer. In some implementations, the previous state may be associated with a most recent, valid route information (e.g., a state of the routing information prior to receiving the first route update).

In some implementations, the second network device 105-2 may receive the second route update via the second IR tunnel 115-2. The second network device 105-2 may update routing information for the first endpoint device 110-1 based on the second route update. In some implementations, the second network device 105-2 may update the routing information for the first endpoint device 110-1 in a manner similar to that described above.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
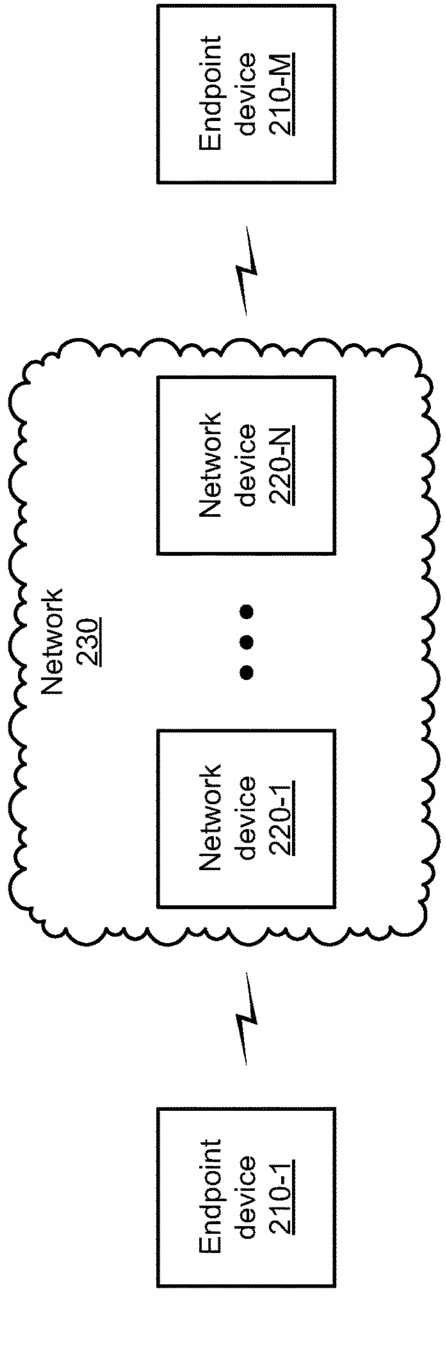
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of endpoint devices 210 (shown as endpoint device 210-1 through endpoint device 210-M), a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a robot, a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210, via network 230 (e.g., by routing packets using network devices 220 as intermediaries).

In some implementations, endpoint device 210 may include a server device. For example, endpoint device 210 may include a laptop computer, a tablet computer, a desktop computer, a group of server devices, or a similar type of device, associated with multicast traffic. In some implementations, endpoint device 210 may receive information from and/or transmit information (e.g., multicast traffic) to another endpoint device 210, via network 230 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include an EVPN-VXLAN, a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
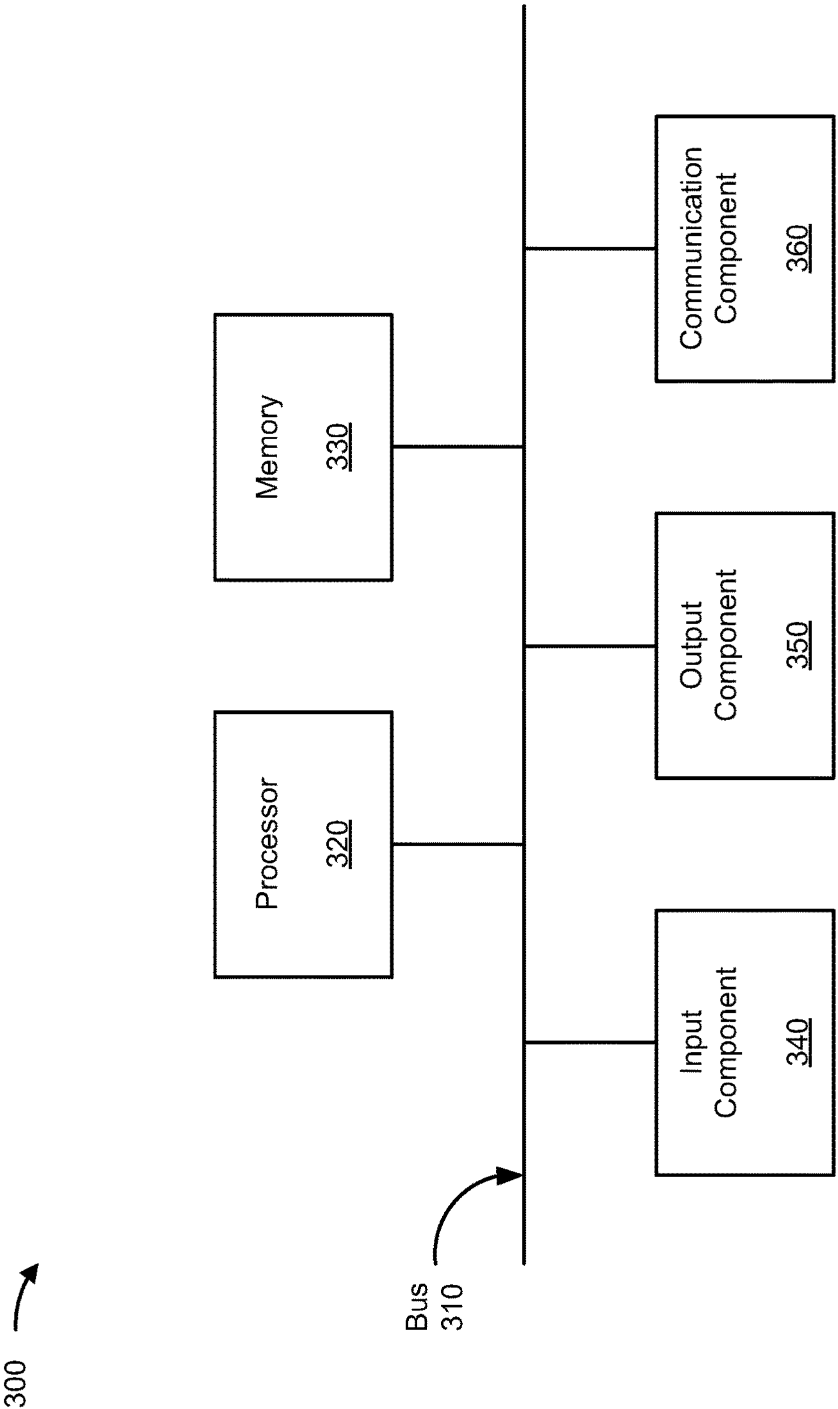
FIG. 3 is a diagram of example components of one or more devices of FIG. 2.

FIG. 3 is a diagram of example components of a device 300, which may correspond to endpoint device 210 and/or network device 220. In some implementations, endpoint device 210 and network device 220 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
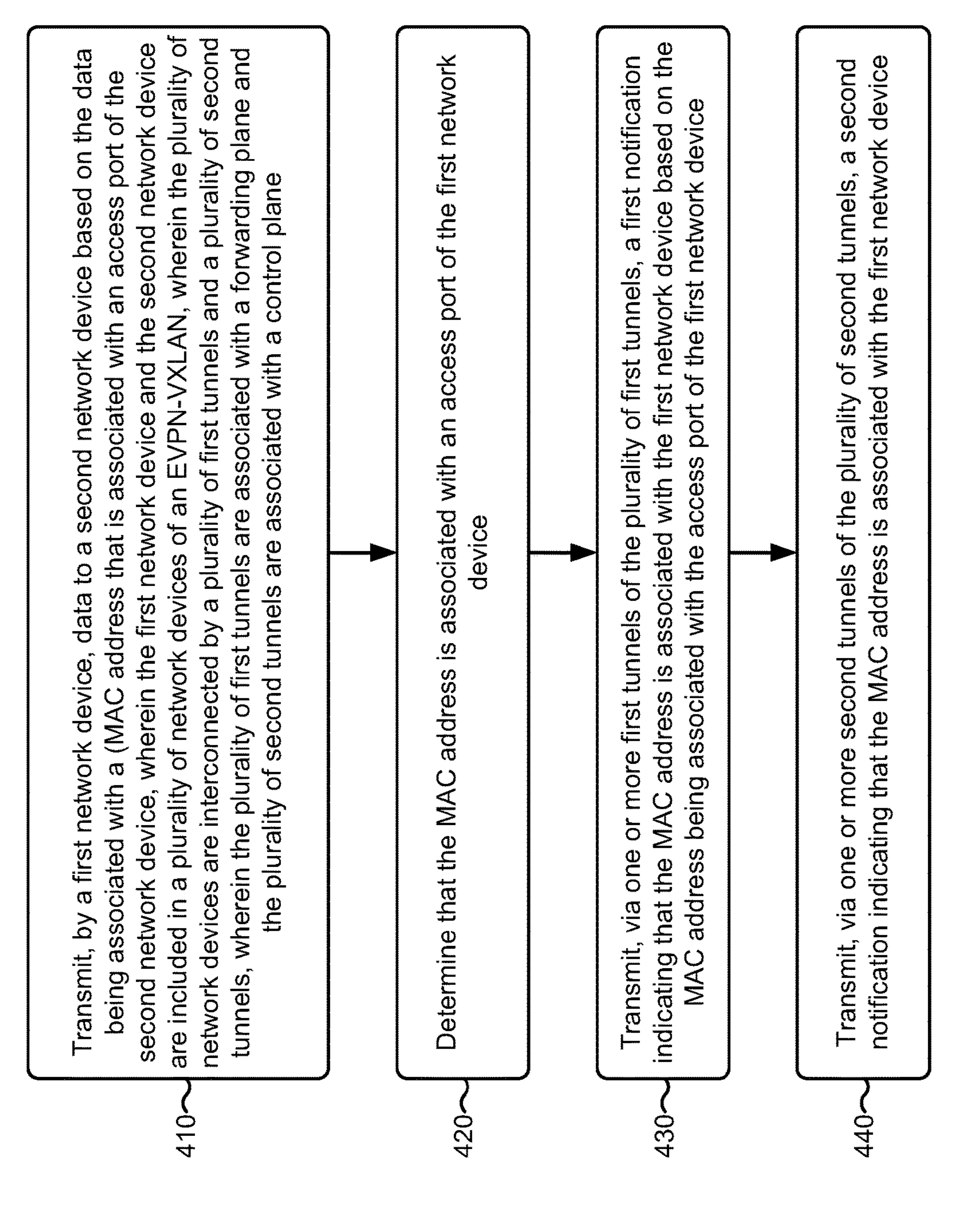
FIG. 4 is a flowchart of example processes relating to low convergence time for a MAC move event.

FIG. 4 is a flowchart of an example process 400 associated with systems and methods for low convergence time for MAC move events. In some implementations, one or more process blocks of FIG. 4 are performed by a first network device (e.g., a first network device 220). In some implementations, one or more process blocks of FIG. 4 are performed by another device or a group of devices separate from or including the first network device, such as a second network device (e.g., a second network device 220), and/or an endpoint device (e.g., an endpoint device 210). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include transmitting data to a second network device based on the data being associated with a MAC address that is associated with an access port of the second network device, wherein the first network device and the second network device are included in a plurality of network devices of an EVPN-VXLAN, wherein the plurality of network devices are interconnected by a plurality of first tunnels and a plurality of second tunnels, wherein the plurality of first tunnels are associated with a forwarding plane and the plurality of second tunnels are associated with a control plane (block 410). For example, the first network device may transmit data to a second network device based on the data being associated with a MAC address that is associated with an access port of the second network device, wherein the first network device and the second network device are included in a plurality of network devices of an EVPN-VXLAN, wherein the plurality of network devices are interconnected by a plurality of first tunnels and a plurality of second tunnels, wherein the plurality of first tunnels are associated with a forwarding plane and the plurality of second tunnels are associated with a control plane, as described above.

As further shown in FIG. 4, process 400 may include determining that the MAC address is associated with an access port of the first network device (block 420). For example, the first network device may determine that the MAC address is associated with an access port of the first network device, as described above.

As further shown in FIG. 4, process 400 may include transmitting, via one or more first tunnels of the plurality of first tunnels, a first notification indicating that the MAC address is associated with the first network device based on the MAC address being associated with the access port of the first network device (block 430). For example, the first network device may transmit, via one or more first tunnels of the plurality of first tunnels, a first notification indicating that the MAC address is associated with the first network device based on the MAC address being associated with the access port of the first network device, as described above.

As further shown in FIG. 4, process 400 may include transmitting, via one or more second tunnels of the plurality of second tunnels, a second notification indicating that the MAC address is associated with the first network device (block 440). For example, the first network device may transmit, via one or more second tunnels of the plurality of second tunnels, a second notification indicating that the MAC address is associated with the first network device, as described above.

Process 400 may include additional implementations, such as any single implementation or any combination of implementations described below and/or in connection with one or more other processes described elsewhere herein.

In a first implementation, the second notification comprises a border gateway protocol advertisement.

In a second implementation, alone or in combination with the first implementation, MAC learning is enabled on the plurality of first tunnels.

In a third implementation, alone or in combination with one or more of the first and second implementations, the plurality of first tunnels comprises a plurality of egress link protection tunnels and the plurality of second tunnels comprises a plurality of ingress replication tunnels.

In a fourth implementation, alone or in combination with one or more of the first through third implementations, process 400 includes receiving, via a first tunnel of the plurality of first tunnels, a third notification, wherein the third notification indicates that the MAC address is associated with a third network device, of the plurality of network devices, and updating a MAC table to indicate that the MAC address is associated with the third network device based on the third notification, wherein the MAC table indicates that traffic associated with the MAC address is to be transmitted via the first tunnel, and wherein a forwarding construct of the first network device redirects the traffic to be transmitted via a second tunnel of the plurality of second tunnels.

In a fifth implementation, alone or in combination with one or more of the first through fourth implementations, process 400 includes receiving a fourth notification indicating that the MAC address is associated with the third network device, wherein the fourth notification is received via the second tunnel, and updating the MAC table to indicate that the traffic associated with the MAC address is to be transmitted via the second tunnel.

In a sixth implementation, alone or in combination with one or more of the first through fifth implementations, process 400 includes determining that a fourth notification indicating that the MAC address is associated with the third network device is not received via the second tunnel prior to an expiration of a time period, and updating the MAC table to indicate that the MAC address is associated with the first network device based on the fourth notification not being received via the second tunnel prior to the expiration of the time period.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

transmitting, by a first network device, data to a second network device based on the data being associated with a media access control (MAC) address that is associated with an access port of the second network device, wherein the first network device and the second network device are included in a plurality of network devices of an Ethernet virtual private network-virtual extensible local area network (EVPN-VXLAN), wherein the plurality of network devices are interconnected by a plurality of first tunnels and a plurality of second tunnels, wherein the plurality of first tunnels are associated with a forwarding plane and the plurality of second tunnels are associated with a control plane, and wherein the plurality of first tunnels comprises a plurality of egress link protection (ELP) tunnels and the plurality of second tunnels comprises a plurality of ingress replication tunnels, determining, by the first network device, that the MAC address is associated with an access port of the first network device;

transmitting, by the first network device and via one or more first tunnels of the plurality of first tunnels, a first notification indicating that the MAC address is associated with the first network device based on the MAC address being associated with the access port of the first network device, wherein the one or more first tunnels include a mesh of ELP tunnels which is utilized only for transmitting updates to MAC routes; and transmitting, by the first network device and via one or more second tunnels of the plurality of second tunnels, a second notification indicating that the MAC address is associated with the first network device.

2. The method of claim 1, wherein the second notification comprises a border gateway protocol advertisement.

3. The method of claim 1, wherein MAC learning is enabled on the plurality of first tunnels.

4. The method of claim 1, wherein the plurality of first tunnels comprises a plurality of ELP tunnels and the plurality of second tunnels comprises a plurality of ingress replication tunnels.

5. The method of claim 1, further comprising:

receiving, via a first tunnel of the plurality of first tunnels, a third notification, wherein the third notification indicates that the MAC address is associated with a third network device, of the plurality of network devices; and updating a MAC table to indicate that the MAC address is associated with the third network device based on the third notification, wherein the MAC table indicates that traffic associated with the MAC address is to be transmitted via the first tunnel, and wherein a forwarding construct of the first network device redirects the traffic to be transmitted via a second tunnel of the plurality of second tunnels.

6. The method of claim 5, further comprising:

receiving a fourth notification indicating that the MAC address is associated with the third network device, wherein the fourth notification is received via the second tunnel; and updating the MAC table to indicate that the traffic associated with the MAC address is to be transmitted via the second tunnel.

7. The method of claim 5, further comprising:

determining that a fourth notification indicating that the MAC address is associated with the third network device is not received via the second tunnel prior to an expiration of a time period; and updating the MAC table to indicate that the MAC address is associated with the first network device based on the fourth notification not being received via the second tunnel prior to the expiration of the time period.

8. A non-transitory computer-readable medium storing a set of instructions, the set of instructions comprising:

one or more instructions that, when executed by one or more processors of a first network device, cause the first network device to:

transmit data to a second network device based on the data being associated with a media access control (MAC) address that is associated with an access port of the second network device, wherein the first network device and the second network device are included in a plurality of network devices of an Ethernet virtual private network-virtual extensible local area network (EVPN-VXLAN), and wherein the plurality of network devices are interconnected by a plurality of first tunnels and a plurality of second tunnels, wherein the plurality of first tunnels are associated with a forwarding plane and the plurality of second tunnels are associated with a control plane;

determine that the MAC address is associated with an access port of the first network device;

transmit, via one or more first tunnels of the plurality of first tunnels, a first notification indicating that the MAC address is associated with the first network device based on the MAC address being associated with the access port of the first network device, wherein the one or more first tunnels are utilized only for transmitting updates to MAC routes; and transmit, via one or more second tunnels of the plurality of second tunnels, a second notification indicating that the MAC address is associated with the first network device.

9. The non-transitory computer-readable medium of claim 8, wherein the second notification comprises a border gateway protocol advertisement.

10. The non-transitory computer-readable medium of claim 8, wherein MAC learning is enabled on the plurality of first tunnels.

11. The non-transitory computer-readable medium of claim 8, wherein the plurality of first tunnels comprises a plurality of egress link protection tunnels and the plurality of second tunnels comprises a plurality of ingress replication tunnels.

12. The non-transitory computer-readable medium of claim 8, wherein the one or more instructions further cause the first network device to:

receive, via a first tunnel of the plurality of first tunnels, a third notification, wherein the third notification indicates that the MAC address is associated with a third network device, of the plurality of network devices; and update a MAC table to indicate that the MAC address is associated with the third network device based on the third notification, wherein the MAC table indicates that traffic associated with the MAC address is to be transmitted via the first tunnel, and wherein a forwarding construct of the first network device redirects the traffic to be transmitted via a second tunnel of the plurality of second tunnels.

13. The non-transitory computer-readable medium of claim 12, wherein the one or more instructions further cause the first network device to:

receive a fourth notification indicating that the MAC address is associated with the third network device, wherein the fourth notification is received via the second tunnel; and update the MAC table to indicate that the traffic associated with the MAC address is to be transmitted via the second tunnel.

14. The non-transitory computer-readable medium of claim 12, wherein the one or more instructions further cause the first network device to:

determine that a fourth notification indicating that the MAC address is associated with the third network device is not received via the second tunnel prior to an expiration of a time period; and update the MAC table to indicate that the MAC address is associated with the first network device based on the fourth notification not being received via the second tunnel prior to the expiration of the time period.

15. A first network device, comprising:

one or more memories; and one or more processors to:

transmit data to a second network device based on the data being associated with a media access control (MAC) address that is associated with an access port of the second network device, wherein the first network device and the second network device are included in a plurality of network devices of an Ethernet virtual private network-virtual extensible local area network (EVPN-VXLAN), and wherein the plurality of network devices are interconnected by a plurality of first tunnels and a plurality of second tunnels, wherein the plurality of first tunnels are associated with a forwarding plane and the plurality of second tunnels are associated with a control plane;

determine that the MAC address is associated with an access port of the first network device;

transmit, via one or more first tunnels of the plurality of first tunnels, a first notification indicating that the MAC address is associated with the first network device based on the MAC address being associated with the access port of the first network device, wherein the one or more first tunnels are utilized only for transmitting updates to MAC routes; and transmit, via one or more second tunnels of the plurality of second tunnels, a second notification indicating that the MAC address is associated with the first network device.

16. The first network device of claim 15, wherein the second notification comprises a border gateway protocol advertisement.

17. The first network device of claim 15, wherein MAC learning is enabled on the plurality of first tunnels.

18. The first network device of claim 15, wherein the plurality of first tunnels comprises a plurality of egress link protection tunnels and the plurality of second tunnels comprises a plurality of ingress replication tunnels.

19. The first network device of claim 15, wherein the one or more processors are further to:

receive, via a first tunnel of the plurality of first tunnels, a third notification, wherein the third notification indicates that the MAC address is associated with a third network device, of the plurality of network devices; and update a MAC table to indicate that the MAC address is associated with the third network device based on the third notification, wherein the MAC table indicates that traffic associated with the MAC address is to be transmitted via the first tunnel, and wherein a forwarding construct of the first network device redirects the traffic to be transmitted via a second tunnel of the plurality of second tunnels.

20. The first network device of claim 19, wherein the one or more processors are further to:

receive a fourth notification indicating that the MAC address is associated with the third network device, wherein the fourth notification is received via the second tunnel; and update the MAC table to indicate that the traffic associated with the MAC address is to be transmitted via the second tunnel.

* * * * *